March 25, 1969  E. C. BRAINARD II  3,434,451
METHOD AND APPARATUS FOR UNDERWATER TOWING OF SEISMIC
HYDROPHONE ARRAYS
Filed June 28, 1967
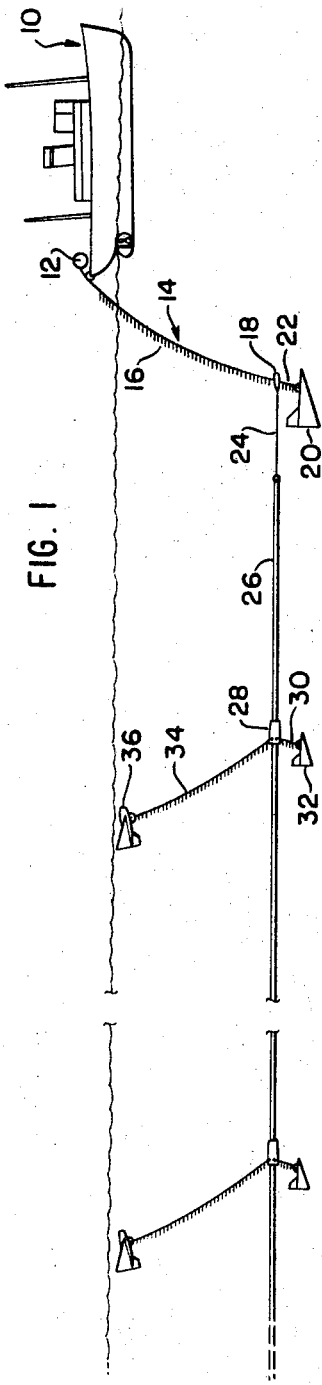
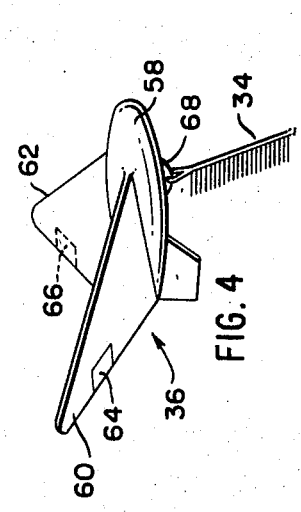
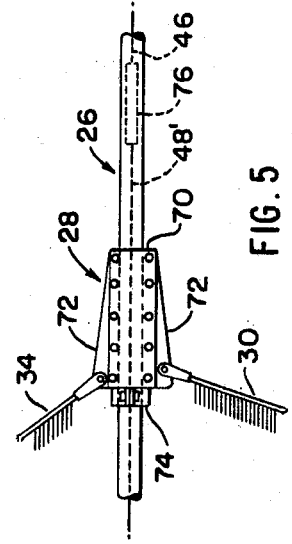
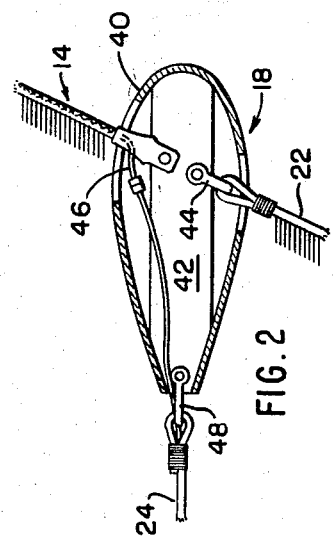
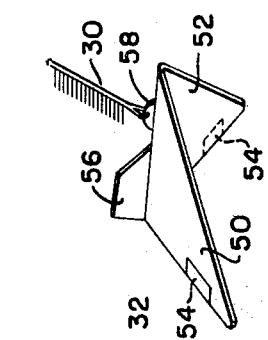
INVENTOR.
EDWARD C. BRAINARD, II
BY
Kenway, Jenney + Hildreth
ATTORNEYS

United States Patent Office
3,434,451
Patented Mar. 25, 1969

3,434,451
METHOD AND APPARATUS FOR UNDERWATER TOWING OF SEISMIC HYDROPHONE ARRAYS
Edward C. Brainard II, Marion, Mass., assignor to Braincon Corporation, Marion, Mass., a corporation of Massachusetts
Filed June 28, 1967, Ser. No. 649,609
Int. Cl. B63b *21/56, 23/00*
U.S. Cl. 114—235  10 Claims

ABSTRACT OF THE DISCLOSURE

A method and apparatus for the continuous towing of seismic hydrophone arrays at a substantially constant depth in a body of water is described. A number of towed vehicles capable of generating hydrodynamic lift are coupled together in pairs, the vehicles in each pair being oriented to generate lift in opposite directions when under tow so as to provide counterbalancing forces which maintain one vehicle very close to the surface of the water and the other vehicle at a relatively fixed depth below the surface when under tow. A seismic hyprophone array is connected to each of the pairs of vehicles and is also maintained at a relatively fixed depth by them. The vehicles are towed from one of the deeper underwater vehicles by means of a towing cable extending downwardly from a ship or other water-borne vessel which carries a sound source for the generation of the acoustic signals which are to be detected by the hydrophone array.

Background of the invention

In seismic prospecting techniques, geologic structures are examined by means of acoustic signals which are directed toward the structure from an acoustic signal source and thence reflected from the structure to an acoustic pickup; certain characteristics of the geologic structure are determined by analyzing such features of the received acoustic signals as signal strength, transit time, etc. In off-shore exploration, where the geologic structure of a subsurface bed of the ocean or other water body is to be explored, a continuous survey may be carried out by means of a moving ship or other water-borne vessel which tows an array of acoustic transducers and which generates sound waves for reflection into these transducers from the subsurface bed. In order to prevent unwanted reflections from the water-air interface existing at the surface of the water body, it is desirable that the hydrophone array be towed below the surface of the water and at a depth which is relatively constant. Further, in order to minimize the information loss caused by unwanted reflections, it is desirable that the moving array of hydrophones be strung out over a relatively long distance; thus, hydrophone arrays of two miles in length are often found desirable.

In order to tow long arrays of hydrophones at a relatively fixed depth, special precautions must be taken. One early technique utilized a buoyant towed array which was weighted at predetermined locations so that the hydrophone array sunk to the desired depth when the towing ceased. This technique causes great strain on the array when it is being towed on the surface and prevents continuous seismic exploration since the array is at the desired depth only at zero speed. Another technique utilized buoyant planing floats in combination with a weighted hydrophone array; this technique, as well as introducing extraneous noise caused by surging of the float, also places excessive stress on the array and generates handling problems due to the weight attached to the array. Still other techniques of bringing the hydrophone array to the desired depth have been utilized, among these the provision of "dead" sections in the hydrophone array whose buoyancy is changed by transferring oil to or from the dead sections. Techniques of this type require a rather sensitive feedback control circuit to continuously monitor the depth of the array and require motors and pumps which continuously consume power and which are subject to mechanical breakdown. Further, a large amount of acoustic noise is generated in such systems and this noise impairs the quality of the system performance.

Summary of the invention

I have developed a method and apparatus for the continuous towing of a hydrophone array of substantial length at a relatively fixed depth, the apparatus consisting of a number of lifting vehicles which generate positive hydrodynamic lift when under tow for maintaining the vehicles adjacent the surface of the body of water in which they are being towed, a number of depressor vehicles which generate negative hydrodynamic lift when under tow to maintain the vehicles at a substantial depth below the surface of the water, and a cable interconnecting the respective lifting and depressor vehicles in pairs, the forces acting on the interconnected vehicles and the associated connecting cables counterbalancing each under tow so that the depressor vehicles are maintained at a relatively fixed depth within the water. The hydrophone array is attached to the vehicle system and is therefore also maintained at a relatively fixed depth. A towing cable is attached to one of the depressor vehicles for towing the system of vehicles, each depressor vehicle serving as a secondary towing source for its associated lifting vehicle. In this manner, the towing and fluid-drag forces are distributed evenly throughout the system and thus cause minimum wear on the hydrophone array. The acoustic noise generated in the hydrophone array of such a towing system is only slightly above the noise generated by a towed array without depth stabilization.

Accordingly, it is an object of my invention to provide a method and apparatus for depth stabilization of continuously towed objects. Further, it is an object of my invention to provide an improved depth stabilizing system for the continuous towing of seismic hydrophone arrays. Another object of my invention is to provide a method and apparatus for the towing of such arrays with generation of a minimum of acoustic noise.

One feature of my invention resides in the provision of towed vehicles generating hydrodynamic lift in opposite directions, the oppositely-directed lifting forces being utilized to stabilize the hydrophone array at a relatively fixed depth. Another feature of my invention resides in the provision of a number of towed depressor vehicles which serve as secondary towing sources for associated lifting vehicles to provide depth stabilization.

The above and other and further objects and features of my invention will become more readily apparent when reference is made to the following detailed description of the drawings in which:

FIG. 1 is a diagrammatic view of the apparatus of my invention showing the position of the component elements when under tow;

FIG. 2 is a side elevational view, partly in section, of a preferred form of towing pod for use in conjunction with the apparatus of FIG. 1;

FIGS. 3 and 4 are pictorial views of preferred forms of depressor and lifting vehicles respectively; and FIG. 5 is an enlarged diagrammatic view of a connecting clamp for connecting a hydrophone array to the tow vehicles.

In FIG. 1 of the drawings, a towing vessel 10 carries a winch 12 on which is wound a cable 14 having a number of trailing filamentary fibers 16 for reducing fluid drag on the cable. These fibers are described in greater detail in co-pending U.S. application No. 371,537, filed June 1, 1964, and assigned to the assignee of the present invention. The cable 14 carries a number of electrical conductors (not shown in FIG. 1) in its core and is reinforced with steel wire or braid so as to carry the requisite mechanical forces for towing the hydrophone array and associated apparatus. The cable 14 extends downwardly to a towing pod 18 to which a depressor vehicle 20 is attached by means of a connecting cable 22; to assist in relieving excessive shocks on the cable 14 and pod 18 when the towing has commenced, the latter is preferably formed from an elastic shock cord.

An elastic shock cord 24 is also extended between the towing pod 18 and a hydrophone array 26. The cord 24 carries a series of electrical conductors at its core, these conductors being carried through the pod 18 from the cable 14 and connecting with the hydrophone elements in the line 26. The latter extends through a connector clamp 28 to which is attached a first cable 30 leading to a depressor vehicle 32 and a second cable 34 leading to a lifting vehicle 36. The vehicles 32 and 36 are effectively connected in pairs via the connector 28 which supports the hydrophone array 26. Additional pairs of lifting and depressor vehicles are attached to the hydrophone line via connectors corresponding to the connector 28 as indicated in FIG. 1. The spacing between the pairs of vehicles will be dependent on such factors as the particular type of hydrophone array being utilized, the length of the array, and the towing speed, among others; for hydrophone arrays of from 5,000 to 10,000 feet in length, a spacing of approximately 1,000 feet between vehicle pairs is appropriate.

FIG. 2 is a side elevational view, partly in section, of the towing pod 18 showing a preferred form of construction for this pod. As shown in the drawing, the pod 18 is formed from an outer skin 40 having a spine plate 42 extending longitudinally through it. The towing cables 14 and 22 are connected to the spine plate by means of shackles 44 or the like. Inner conducting wires 46 which are located within the cable 14 to carry the acoustic signals from the hydrophone array to the ship are brought out from the cable within the pod and are fed through the elastic shock cord 24 at the open-ended rear of the pod into the hydrophone array 26. The cord 24 is firmly attached to the back plate 42 of the pod by means of a shackle 48. The pod 18 is advantageously formed from a fiberglass shell and has a wing-shaped cross-section to reduce hydroynamic drag when under tow.

FIG. 3 of the drawings is a pictorial view of a depressor vehicle of the type utilized in accordance with my invention. The depressor vehicle 32 consists of a pair of wing portions 50 and 52 positioned at an obtuse angle with respect to each other to form a negative dihedral angle. A pair of trim tabs 54 may be positioned on the rear edge of the wing members to provide necessary trim adjustment; a vertical stabilizer 56 is rigidly attached to the vehicle to provide increased lateral stability. A clevis 58, which is positioned forward of the lateral and longitudinal centers of pressure of the vehicle 32, provides a stable towing point for the vehicle. When the vehicle 32 is towed with the orientation shown in FIG. 3, a downward or "negative" hydrodynamic lift is generated. This negative lift depresses the vehicle until the vertical component of the downward force is balanced by the oppositely-directed vertical component of tension in the cable 30. The vehicle 20 is of the same shape as the vehicle 32 and accordingly need not be further described.

A preferred form of lifting vehicle 36 is shown in FIG. 4 of the drawings. In contrast to the vehicle 32, the vehicle 36 has a central body portion 58 to which upwardly extending delta shaped wings 60 and 62 are attached. The wings are positioned at an obtuse angle with respect to each other so that a positive dihedral angle is obtained. Trim tabs 64 and 66 may be provided at the rear edges of the wings to allow the orientation of the vehicle to be controlled. A clevis 68 is positioned on the under side of the vehicle 36 at a location forward of the lateral and longitudinal centers of pressure as was the case with the vehicle 32 of FIG. 3. The vehicle 36 generates a positive lifting force when under tow; this upward lifting force is counterbalanced by the downward tension developed in the cable 34 during the towing process. Under conditions of dynamic equilibrium, the vehicle 36 positions itself adjacent the water surface and slightly below it. This is the result of two effects. Should the lifting vehicles, such as vehicle 36 tend to lift out of the water the wings 60 and 62 will lose lift and the vehicle will be pulled back into the water. The second effect, which may be termed the "subsurface effect" operates as follows. As the lifting vehicles, such as vehicle 36, approach the air water interface, there appears to be a substantially increased resistance to further lifting of the vehicle. The net result of these two effects is that the lifting vehicles position themselves adjacent to, but just below the water surface when under tow.

The vehicles 20, 32 and 36 may advantageously be formed from a hard, relatively light-weight material such as fiberglass. Further details concerning the particular characteristics of vehicles of this type may be obtained from U.S. Pat. No. 3,137,264, issued June 16, 1964 and assigned to the assignee of the present invention.

FIG. 5 is a diagrammatic view of the connector 28 showing the attachment of the cables 30 and 34 and the hydrophone array 26 to the connector in greater detail. The connector 28 consists of a tubular body 70 in the form of a split collar clamp fitted around the array 26 and having fins 72 for attachment to the cables 30 and 34 respectively. The rear portion of the tubular body 70 is internally threaded for reception of a correspondingly threaded stopper 74 which is used to firmly attach the connector 28 to the hydrophone array 26. As may be seen from the drawing, the array 26 is in the form of a cable having an outer sheathing layer into which a number of hydrophones 76 are inserted at spaced intervals. These hydrophones are electrically connected to each other in predetermined arrangements by means of electrical conductors 46 which are contained within the hydrophone line and which pass through the shock cord 24, into the pod 42, up the cable 14, and to the appropriate signal processing circuitry (not shown) within the ship 10.

The operation of my invention may now be understood in more detail. The vehicles 32 and 36 which are connected in pairs operate with balanced opposing forces to maintain the hydrophone array at the desired depth. Thus, the downward forces generated by the depressor vehicle and the towing cables during the towing operation are counterbalanced by the upward force generated by the lifting vehicle 36; the latter generates sufficient counterbalancing lift to maintain itself adjacent the surface of the water at all times. At zero towing speed, the depressor vehicle the hydrophone array, and the interconnecting cables and fittings are designed to have a net negative buoyance, which is somewhat greater than the desired depth while the lifting vehicle 36 is designed to have a positive buoyancy slightly greater than the negative buoyancy of the remaining components of the system. As a result, the vehicle 36 sinks slightly in the water until the system arrives at its static equilibrium when not being towed; at this stage, the vehicle 36 is partially, but not completely, submerged within the water.

When towing is commenced, the towing pod 18 is suddenly pulled upwardly by the cable 14; this sets the depressor vehicle 20 in motion and this vehicle begins generating a downward force (negative lift). Simultaneously, the hydrophone array 26, and through this the depressor vehicle 32, is set into motion. The shock which would otherwise be transmitted to the vehicle 20, the hydrophone array 26, and the vehicle 32, is cushioned by the utilization of elastic shock cords 22 and 24 between the towing pod and the depressor vehicle 20 and the hydrophone array 26 respectively. During the towing, the drag forces generated by the cables 14 and 30 tend to elevate these cables, while the drag forces generated by the cable 34 tends to depress this cable. The upward drag forces are counterbalanced by the depressive forces generated by the vehicles 20 and 32 respectively, while the downward drag forces are counterbalanced by the lifting force generated by the vehicle 36. The vehicles 20 and 32 therefore seek a given depth for a fixed towing speed and fixed cable length and maintain this depth as long as the towing conditions remain unchanged. Thus the hydrophone array 26, which is supported between the lifting and depressor vehicles by means of the connectors 28 and the connecting cables 30 and 34, is brought to a fixed depth as determined by the towing speed and the length of the towing cables and is maintained at this depth under conditions of dynamic equilibrium during the towing operation.

As previously explained the lifting vehicle 36 operates slightly below the surface of the water. Should the vehicle approach the surface too closely while under tow due to such factors as surface roughness which may generate large waves over the vehicle, the "sub-surface" effect arises which diminishes the lift coefficient of the vehicle and retards the piercing of the water-air interface. This limits the surging of the lifting vehicle and minimizes the strain placed on the system.

As an example of the advantageous results obtainable with my invention, the following data is provided: A hydrophone array manufactured to substantially neutral buoyance and approximately 8,000 feet in length was maintained at a depth of 35 feet through the use of 8 pairs of lifting and depressor vehicles connected to each other in pairs in the manner shown for the vehicles 32 and 36. The vehicles were 2 feet in length and had trim tabs set to approximately 30° and 15° respectively; each lifting vehicle generated a lifting force approximately three times as large as the depressing force generated by the corresponding depressor vehicle. The vehicle 20 was 4 feet in length. The vehicles were connected to the hydrophone array with tow cables 30 and 34 of 0.125 inch outside diameter stainless steel wire rope with filamentary fairing elements and of length 10 and 40 feet respectively. At zero speed, each vehicle pair had a net positive buoyancy of approximately 6 pounds so that the lifting vehicles (which each had a buoyancy of 17 pounds) remained partially submerged within the water but adjacent the surface.

At a towing speed of 5 knots, the cable 14 made an angle of approximately 9 degrees with the horizontal; approximately 175 feet of cable was required to maintain the system at a depth of 30 feet. A towing tension of 3500 pounds was generated in the cable during the towing operation. The total noise output of the entire hydrophone array was 8 to 10 microvolts, as compared with a noise output of 6 to 7 microvolts for the array when towed at the same speed without depth stabilization and an ambient noise at zero speed of 4 microvolts. With depth stabilizers of the buoyant-planning type, typical noise measurements of 20 microvolts at 5 knots towing speed were obtained.

Although my invention has so far been described with particular reference to towing seismic hydrophone arrays, it will be apparent that my invention is not so limited. In particular, it will be apparent that various other uses may be made of my invention without departing from its spirit and scope. Thus, the hydrophone array may be replaced by any linearly extended object which is to be towed a fixed distance below the surface of a water body. Also, a single object may be maintained at a predetermined depth when under tow if desired. Other changes may also be made within the scope and spirit of my invention and it is intended that the foregoing material be taken as illustrative only and not in a limiting sense.

From the above it will readily be seen that I have provided a method and apparatus for the continuous towing of a linearly extended object of substantial length at a fixed depth. Further, I have provided a method and apparatus for towing such an object without generating an excessive amount of acoustic noise.

Having illustrated and described a preferred embodiment of my invention, what I claim is new and desire to secure by Letters Patent is:

1. Apparatus for the continuous towing of an object at a fixed depth in a fluid, said apparatus comprising, in combination, a lifting vehicle generating hydrodynamic lift in a first direction when under tow, a depressor vehicle generating hydrodynamic lift in a direction opposite to said first direction when under tow whereby said depressor vehicle is maintained at a substantial depth below the surface of the fluid, means interconnecting the lifting vehicle and depressor vehicle, means attached to said interconnecting means for supporting said object with respect to said vehicles in such a manner that said object is disposed at a substantially constant distance from said depressor vehicle during said towing, and means operatively attached to said depressor vehicle for towing said lifting and said depressor vehicles through said fluid, said vehicles thereby generating counterbalancing hydrodynamic forces for maintaining said depressor vehicle at a relatively constant depth when said vehicles are under tow whereby said towed object may be maintained at a relatively constant depth in unison with said depressor vehicle.

2. The combination defined in claim 1 in which said lifting vehicle and said depressor vehicle each utilize a pair of delta shaped wings dihedrally located with respect to each other, said lifting and depressor vehicles being positioned with positive and negative dihedral angles respectively when said vehicles are under tow whereby counterbalancing hydrodynamic forces operating in opposite directions may be generated by said vehicles.

3. Apparatus for the continuous towing of an elongated member of substantial length at a substantially fixed depth in a fluid, said apparatus comprising, in combination, a plurality of lifting vehicles generating hydrodynamic lift in a first direction when under tow, a plurality of depressor vehicles generating hydrodynamic lift in a direction opposite to said first direction when under tow said depressor vehicles being maintained at a substantial depth below said fluid surface, means interconnecting the respective lifting vehicles and depressor vehicles, means attached to said interconnecting means for supporting said member with respect to said vehicles in such a manner that said member is disposed at a substantially constant distance from said depressor vehicle during said towing, and means operatively attached to at least one of said depressor vehicles for towing said lifting and said depressor vehicles through said fluid, said vehicles thereby generating counterbalancing hydrodynamic forces for maintaining said depressor vehicle and said member at a relatively constant depth when said vehicles are under tow.

4. The combination defined in claim 3 in which said lifting vehicles and said depressor vehicles are interconnected in pairs, each said depressor vehicle serving as a towing body for its associated lifting vehicle and being maintained at a relatively constant depth by means of said lifting vehicle when said vehicles are under tow.

5. The combination defined in claim 3 in which said lifting vehicles and said depressor vehicles each utilize a pair of delta shaped wings dihedrally located with respect to each other, said lifting and depressor vehicles being positioned with positive and negative dihedral angles respectively when said vehicles are under tow whereby counterbalancing hydrodynamic forces operating in opposite directions may be generated by said vehicles.

6. A method of towing seismic hydrophone arrays of substantial length through a fluid, comprising the steps of attaching said array to a plurality of vehicles capable of generating hydrodynamic forces when under tow, interconnecting said vehicles in pairs to form a dynamic towing system, the vehicles in said pairs being oriented for generating hydrodynamic forces in vertically opposed directions to maintain said vehicles and the associated interconnections in dynamic equilibrium, one vehicle of each of said pairs being maintained adjacent the surface of said fluid and other vehicle of each of said pairs being maintained at a relatively fixed depth within the fluid, and connecting a towing source to at least one of the more deeply submerged of said vehicles, said vehicle serving as a secondary towing source for the remaining vehicles in said system whereby said array is maintained at a relatively fixed depth when under tow.

7. The method defined in claim 6 in which said vehicles are attached to each other in pairs for generating opposing and counterbalancing hydrodynamic forces for maintaining said vehicles spaced apart a fixed distance from each other when under tow.

8. Apparatus for the continuous towing of an object at a fixed depth in a fluid combining, a first leading depressor vehicle adapted to generate hydrodynamic lift in a direction tending to submerge said first depressor vehicle when said vehicle is towed, means restraining said first depressor vehicle from hydrodynamically submerging beyond a predetermined depth, a submergible trailing object operatively connected to said first depressor vehicle, a second trailing depressor vehicle adapted to generate hydrodynamic lift in a direction tending to submerge said second depressor vehicle when said second vehicle is towed, said second depressor vehicle being connected to a trailing portion of said trailing object thereby tending to submerge said trailing portion of said trailing object in unison with said second trailing depressor vehicle, a lifting vehicle adapted to generate hydrodynamic lift in a direction opposite to that generated by said depressor vehicle, and means operatively interconnecting said lifting vehicle to said second trailing depressor vehicle so as to counterbalance said hydrodynamically generated submerging forces of said second depressor vehicle thereby tending to maintain said second depressor vehicle at a constant depth, said interconnecting means being so dimensioned as to cause said second depressor vehicle to be submerged at substantially the same depth as that of the first leading depressor vehicle.

9. An apparatus as claimed in claim 8 wherein said towed object is of elongated configuration, said apparatus further comprising, a plurality of second depressor vehicles connected to said elongated object in longitudinally spaced relation along the length of said object, and a plurality of lifting vehicles connected to said elongated object each of said lifting vehicles being connected to said elongated object at a location to which one of said second depressor vehicles is connected to thereby define or plurality of cooperative pairs of vehicles spaced along the length of said elongated object.

10. Apparatus for the continuous towing of an object at a fixed depth in a fluid comprising, a depressor vehicle generating hydrodynamic lift in a direction tending to submerge said depressor vehicle when said depressor vehicle is towed, a lifting vehicle generating hydrodynamic lift, when towed, in a direction that is towards the surface of said fluid and in opposition to the direction of lift of said depressor vehicle, said depressor vehicle having inherent attitude stability characteristics such as to maintain an attitude wherein the lifting force generated by said depressor vehicle has substantially no component acting in a lateral direction, means interconnecting said depressor and lifting vehicles to enable said lifting forces generated by said vehicles to act in opposition to each other whereby said vehicles and said interconnecting means may be maintained at a substantially constant depth when under tow, and means connecting said object to said combination of said vehicles and interconnecting means whereby said towed object may be maintained at a substantially constant depth in unison with said vehicles and interconnecting means when under tow.

References Cited

UNITED STATES PATENTS

| | | |
|---|---|---|
| 1,160,525 | 11/1915 | Mystin. |
| 2,632,150 | 3/1953 | Silverman et al. |
| 3,137,264 | 6/1964 | Brainard et al. |

TRYGVE M. BLIX, *Primary Examiner.*